(12) United States Patent
Turunc et al.

(10) Patent No.: US 11,339,349 B2
(45) Date of Patent: May 24, 2022

(54) POLYGLYCEROL FATTY ACID ESTERS (PGE) FOR CORN OIL EXTRACTION

(71) Applicant: BL TECHNOLOGIES, INC., Minnetonka, MN (US)

(72) Inventors: Umit Turunc, Trevose, PA (US); Michael Raab, Trevose, PA (US)

(73) Assignee: BL Technologies, Inc., Minnetonka, MN (US)

( * ) Notice: Subject to any disclaimer, the term of this patent is extended or adjusted under 35 U.S.C. 154(b) by 0 days.

(21) Appl. No.: 17/040,275

(22) PCT Filed: Jun. 13, 2018

(86) PCT No.: PCT/US2018/037200
§ 371 (c)(1),
(2) Date: Sep. 22, 2020

(87) PCT Pub. No.: WO2019/240781
PCT Pub. Date: Dec. 19, 2019

(65) Prior Publication Data
US 2021/0002585 A1 Jan. 7, 2021

(51) Int. Cl.
*C11B 13/00* (2006.01)

(52) U.S. Cl.
CPC .................... *C11B 13/00* (2013.01)

(58) Field of Classification Search
CPC ................. C11B 1/00; C11B 13/00
See application file for complete search history.

(56) References Cited

U.S. PATENT DOCUMENTS

| | | | |
|---|---|---|---|
| 8,841,469 B2 | 9/2014 | Shepperd et al. | |
| 9,255,239 B1 | 2/2016 | Wiese | |
| 9,353,332 B2 | 5/2016 | Lewis et al. | |
| 9,714,398 B2 | 7/2017 | Turunc | |
| 9,816,050 B2 | 11/2017 | Blankenburg et al. | |
| 2012/0125859 A1 | 5/2012 | Collins et al. | |
| 2015/0284659 A1* | 10/2015 | Young | C11B 1/00 554/204 |
| 2016/0160151 A1 | 6/2016 | Sungail et al. | |
| 2016/0168506 A1 | 6/2016 | Murphy et al. | |
| 2016/0244694 A1 | 8/2016 | Sungail et al. | |

(Continued)

FOREIGN PATENT DOCUMENTS

WO 2016114983 A1 7/2016

OTHER PUBLICATIONS

International Search Report and Written Opinion issued in International Application No. PCT/US2018/037200 dated Feb. 14, 2019; 11 pages.

(Continued)

*Primary Examiner* — Yate' K Cutliff
(74) *Attorney, Agent, or Firm* — Armstrong Teasdale LLP

(57) ABSTRACT

An oil separation treatment composition providing a process stream mixture from a corn to ethanol process, and one or more polyglycerol esters of fatty acids (PGE) or mixture of PGE. A method for recovering oil in a corn to ethanol process wherein oil and solids are present in a process stream mixture, the method providing adding to the process stream mixture an oil separation treatment, the oil separation treatment comprises polyglycerol esters of fatty acids (PGE) or mixture of PGE.

18 Claims, 2 Drawing Sheets

(56) References Cited

U.S. PATENT DOCUMENTS

2016/0340608 A1\* 11/2016 Turunc ................ C11B 1/10
2018/0071657 A1 3/2018 Hale et al.

OTHER PUBLICATIONS

Fang et al., "Synergistic effect of surfactants and silica nanoparticles on oil recovery from condensed corn distillers solubles (CCDS)", Industrial Crops and Products, vol. 77, pp. 553-559, 2015.

Mitra et al., "Value-added oil and animal feed production from corn-ethanol stillage using the oleaginous fungus *Mucor circinelloides*", Bioresource Technology, vol. 107, pp. 368-375, 2011.

\* cited by examiner ated Patent
POLYGLYCEROL FATTY ACID ESTERS (PGE) FOR CORN OIL EXTRACTION

CROSS-REFERENCE TO RELATED APPLICATION

This application is a national phase of International Patent Application No. PCT/US2018/037200 filed Jun. 13, 2018, the entirety of which is incorporated by reference herein.

FIELD OF INVENTION

The disclosed technology generally described hereinafter provides for a composition and method for improved corn oil extraction/separation from syrup streams, and more specifically, a composition and method for using polyglycerol fatty acid esters (PGE) for improving corn oil extraction during the corn milling process, especially in the corn ethanol process.

BACKGROUND OF THE INVENTION

Over the past few decades, ethanol has become increasingly important as an alternative fuel. One advantage to use of ethanol fuel is that it can be produced from corn. Ethanol from corn is produced by either the wet-milling or dry-milling process. During the wet-milling process, the corn kernels are ground, and the main constituents (starch, gluten, germ, and fiber) are separated and the starch is further processed to make ethanol. In dry corn milling, the corn kernels are ground and without additional separation, mixed with water and the mixture is further processed to make ethanol. The residue of the ethanol process is referred to as stillage or whole stillage. Whole stillage from dry corn milling contains a mixture of solids, oil, and water soluble components.

Whole-stillage is further processed into several different by-products. Typically whole stillage is centrifuged to separate most of the solids from the liquid phase. The recovered solids are referred to as distillers grains (DG), and if thermally dried, as dried distillers grains (DDG). Both DG and DDG are utilized as animal feed. The liquid phase is referred to as thin stillage. This stillage is further processed by thermal action to reduce the moisture content from >90% to <60-65%. The evaporated thin stillage is referred to as syrup, or condensed corn distillers solubles (CCDS). The syrup contains majority of the corn oil originally present in the feedstock corn for the ethanol process.

Incorporated corn oil is separated from syrup using thermal, mechanical, and/or chemical methods. The primary method for corn oil extraction from syrup is the use of centrifuges. However, centrifugation can only separate the free oil by destabilizing the stable emulsion through coalescence of the dispersed oil droplets. The rest of the oil, bound and trapped, remain with the syrup stream and is not available for sale as a valuable commodity. Therefore, what is needed in the art is a composition and method for improved corn oil separation from syrup streams during the corn ethanol production process.

SUMMARY OF THE INVENTION

The disclosed technology generally described hereinafter provides for a composition and method for improved corn oil extraction/separation from syrup streams. According to one aspect of the disclosed technology, an oil separation treatment composition is provided, the composition comprising a process stream mixture from a corn to ethanol process, and one or more polyglycerol esters of fatty acids (PGE) or mixture of PGE.

In some embodiments, the process stream mixture is present in a whole stillage process stream, a thin stillage process stream, an evaporator, a syrup stream, or at any time after the distillation stage but prior to the oil separation process.

In some embodiments, the PGE is a member or members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

In some embodiments, the PGE is non-toxic and digestible. In some embodiments, the PGE is polyglycerol-3-monooleate. In some embodiments, the PGE is a blend of polyglycerol-3-monooleate, polyglycerol-10-monooleate and polyglycerol-10-dioleate. In some embodiments, the PGE is a blend of polyglycerol-10-monooleate and polyglycerol-10-dioleate.

In some embodiments, about 50 ppm to about 1000 ppm of the oil separation treatment composition is added to the process stream based upon one million parts of the process stream mixture. In some embodiments, the oil separation treatment composition has an HLB of about 5 to about 15. In some embodiments, the oil separation treatment composition has an HLB of about 6 to about 12.

In yet another aspect of the disclosed technology, a method for recovering oil in a corn to ethanol process wherein oil and solids are present in a process stream mixture is provided, wherein the method comprises adding to the process stream mixture an oil separation treatment, the oil separation treatment comprises polyglycerol esters of fatty acids (PGE) or mixture of PGE.

In some embodiments of the present method, the PGE is a member or members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

In some embodiments of the present method, the PGE is polyglycerol-3-monooleate. In some embodiments of the present method, the PGE is a blend of polyglycerol-3-monooleate, polyglycerol-10-monooleate and polyglycerol-10-dioleate. In some embodiments of the present method, the PGE is a blend of polyglycerol-10-monooleate and polyglycerol-10-dioleate.

In some embodiments of the present method, about 50 ppm to about 1000 ppm of the oil separation treatment composition is added to the process stream based upon one million parts of the process stream mixture.

In some embodiments of the present method, the process stream mixture is present in a whole stillage process stream, a thin stillage process stream, an evaporator, a syrup stream, or any time after the distillation stage but prior to the oil separation process.

In some embodiments of the present method, the oil separation process further includes centrifuges, decanters, settling-tanks, clarifiers, filters, dissolved or induced air flotation devices, and any other thermal or mechanical device that separates the corn oil from the process stream mixture. In some embodiments of the present method, the PGE is non-toxic and digestible.

BRIEF DESCRIPTION OF THE DRAWINGS

These and other features of the disclosed technology, and the advantages, are illustrated specifically in embodiments now to be described, by way of example, with reference to the accompanying diagrammatic drawings, in which.

DETAILED DESCRIPTION OF EXEMPLARY EMBODIMENTS

Figure 1:
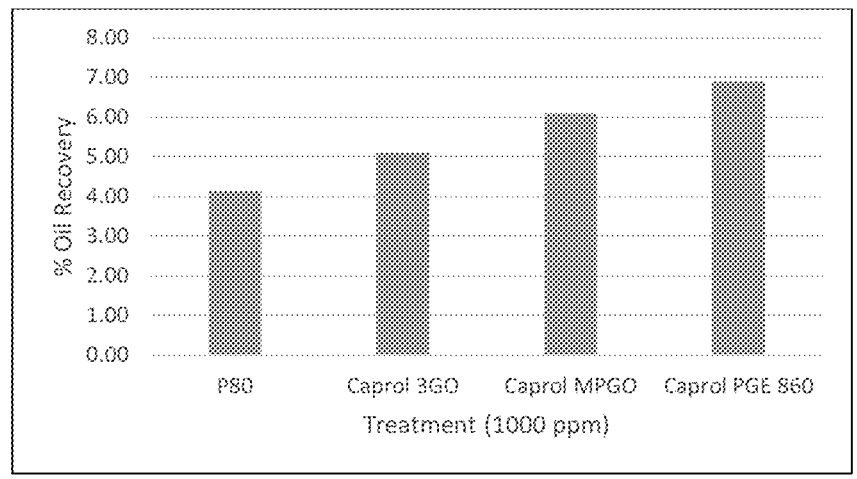
FIG. 1 is a graph providing results of an illustrative embodiment of the disclosed technology.

The disclosed technology generally described hereinafter provides a composition and method for improved corn oil extraction/separation from syrup streams. The disclosed technology provides for an oil separation treatment comprising polyglycerol esters of fatty acids (PGE) or a mixture of PGE for improving corn oil extraction during the corn milling process, especially in the corn-ethanol process.

In the corn-ethanol process, after the ethanol is distilled, the remaining residue (stillage) contains valuable corn oil. The corn ethanol producers separate the corn oil from a portion of the stillage using thermal, mechanical, and/or chemical methods. The disclosed technology provides for an improved separation process that increases corn oil yields by use of PGE's.

The present technology provides for an oil separation treatment composition. The oil separation treatment composition comprises a process stream mixture from a corn to ethanol process, and one or more polyglycerol esters of fatty acids (PGE) or mixture of PGE.

It should be understood by one skilled in the art that in the process stream mixture, the PGE is brought into contact with any oil/solids/water mixture present in such corn to oil processes or into contact with any solids or liquid that will ultimately be brought in contact with such oil/solids/water mixture. The "process stream mixture" or "stillage stream" is provided by, but is not limited to, whole stillage process streams, thin stillage process streams, an evaporator, syrup streams, or anywhere after the distillation stage but prior to the oil separation process.

In some embodiments, the syrup stream of the disclosed technology comprises proteins, lipids, fiber, residual starch, and where most of the oil is present in the feedstock corn kernels. The oil in the syrup provided by the present technology can be present in different forms including, but not limited to (i) free oil, (ii) bound oil, and (iii) trapped oil. In some embodiments, free oil can be described as small droplets in the form of an oil-in-water stable emulsion. In some embodiments, bound oil can be described as small droplets of oil bound on to small particles of corn kernel, such as hydrophobic surfaces of proteins and cell wall components. In some embodiments, trapped oil can be described as intact oil bodies present in the original corn kernel and not released from the germ or endosperm, during the milling process.

The oil separation treatment comprises polyglycerol esters of fatty acids (PGE) or a mixture of PGE. The polyglycerol fatty acid esters (PGE) of the present technology were found to increase the separation of corn oil from the stillage stream by removing the bound oil from the corn particles. The oil droplets, once released from the particle surfaces, can be under the action of mechanical, gravitational, and thermal forces used in the oil separation process, and will coalesce into a homogenous mass of oil that can be subsequently recovered.

In some embodiments, the polyglycerol fatty acid esters (PGE) can be manufactured entirely from plant-based renewable resources (i.e. vegetable oils and plant based fatty acids), and thus, the PGEs are considered readily biodegradable.

In some embodiments, the oil separation treatment composition comprises polyglycerols that can be characterized as homopolymers of glycerol, where ethers are prepared through condensation/dehydration polymerization of glycerol at high temperatures in the presence of acidic or alkaline catalysts.

In some embodiments, the oil separation treatment composition comprises polyglycerols that comprise at least 2 repeating glycerol units. In other embodiments, the polyglycerols comprise at least 10 repeating glycerol units, and in other, embodiments, the polyglycerols comprise between 2 and 30 repeating glycerol units.

In some embodiments, the oil separation treatment composition comprises PGE's with different polyglycerols having three to ten glycerol units, and esters of one or more fatty acids, wherein the esters contain different degrees of esterification, such as mono-esters, di-esters, or mixtures of mono-esters & di-esters.

Some exemplary PGEs, which are commercially available, include, but are not limited to, the following:

| Name | Description |
|---|---|
| Polyglycerol-3-monooleate | Triglycerol mono-ester of oleic acid |
| Polyglycerol-3-dioleate | Triglycerol di-ester of oleic acid |
| Polyglycerol-3-monstearate | Triglycerol mono-ester of stearic acid |
| Polyglycerol-6-distearate | Hexaglycerol di-ester of stearic acid |
| Polyglycerol-10-caprylate/caprate | Decaglycerol mixed mono-ester of caprylic & capric acids |
| Polyglycerol-10-dipalmitate | Decaglycerol di-ester of palmitic acid |
| Polyglycerol-10-monostearate | Decaglycerol mono-ester of stearic acid |
| Polyglycerol-10-monooleate | Decaglycerol mono-ester of oleic acid |
| Polyglycerol-10-dioleate | Decaglycerol di-ester of oleic acid |
| Polyglycerol-10-tetraoleate | Decaglycerol tetra-ester of oleic acid |
| Polyglycerol-10-decaoleate | Decaglycerol deca-ester of oleic acid |

In some embodiments, the PGE is a member or members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

In other embodiments, the PGE is a PGE mixture or blend. In some embodiments, the PGE is a blend of polglyerol-3-monooleate, polyglyerol-10-monooleate and polyglyerol-10-dioleate. In other embodiments, the PGE is a blend of polyglycerol-10-monooleate and polyglycerol-10-dioleate.

PGEs are commonly accepted as human food additives, as well as widely used in drug, cosmetic and household products. In some embodiments, the PGE is a food grade PGE. The food grade PGEs as disclosed can be manufactured by esterifying polyglycerols with fatty acids. In some embodiments, the polyglycerols can be esterified with various fatty acids of a carbon chain length. In some embodiments, the polyglycerols are esterified with various fatty acids having a carbon chain length of about C8 to C22. In some embodiments, the alkyl chain of fatty acids can be saturated, mono-unsaturated or poly-unsaturated.

In some embodiments, when the PGE is a food grade PGE, the polyglycerol part of the molecule contains from three (triglycerol or polyglycerol-3) to ten glycerol (decaglycerol or polyglycerol-10) units. In some embodiments, the esterification process can produce a range of esters, such as, but not limited to, mono-esters, di-esters, mixtures of mono- & di-esters, and up to complete esterification of the parent polyglycerol, whereby every reactive (OH) site is reacted with a fatty acid molecule.

Additionally, the residues from corn milling and corn-ethanol production are widely used as animal feed. Any additives used in in these processes must be non-toxic and approved by regulatory agencies, such as the FDA, as an animal feed additive. Therefore, PGEs of the disclosed technology are non-toxic (acute mammalian toxicity) and digestible, where the non-toxic, bio-degradable and renewable resource characteristics make PGEs very attractive as a process additive in corn milling and corn-ethanol industries.

In some embodiments, the oil separation treatment composition of the disclosed technology is added to the process stream. In some embodiments, about 50 ppm to about 1000 ppm of the oil separation treatment is added to the process stream based upon one million parts of the process stream mixture.

In some embodiments, the oil separation treatment composition has an HLB of about 5 to about 15. In other embodiments, the oil separation treatment composition has an HLB of about 6 to about 12. A person of ordinary skill in the art would readily understand that "HLB" represents the hydrophile-lipophile balance, and is an empirical method for quantifying the surface activity of a given surfactant based on its molecular composition. HLB values are an empirical short-hand method for indicating useful characteristics of surfactants. HLB was initially developed to select surfactants for making emulsions, whereby low HLB value surfactants (for example 3 to 8) are useful for making water-in-oil (w/o) emulsions, and higher HLB value surfactants (for example 12 to 18) are useful for making oil-in-water (o/w) emulsions. However, HLB values have been shown to be useful in most practical surfactant applications, such as solubility of any given surfactant in different solvents, or its suitability for use as a detergent, dispersing aid, or demulsifier. For example, lower HLB value surfactants are soluble in oil or organic solvents, but not in water, and conversely, higher HLB value surfactants are soluble in water, but not in oil.

The present technology further provides for a method for recovering oil in a corn to ethanol process. The oil separation treatment comprises polyglycerol esters of fatty acids (PGE) or mixture of PGE. The oil separation treatment is applied to a process stream mixture that is present in a corn to oil process and the PGEs are completely compatible with current corn oil extraction aids used in the industry, such as polysorbate 80 (P80).

In some embodiments, the PGE of the present method is a member or members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

In some embodiments, the present method provides for about 50 ppm to about 1000 ppm of the oil separation treatment to be added to the process stream based upon one million parts of the process stream mixture.

In some embodiments, the process stream mixture is present in a whole stillage process stream, a thin stillage process stream, an evaporator, a syrup stream, or any time after the distillation stage but prior to the oil separation process. In some embodiments, the oil separation process further includes centrifuges, decanters, settling-tanks, clarifiers, filters, dissolved or induced air flotation devices, and any other thermal or mechanical device that separates the corn oil from the process stream mixture.

EXAMPLES

The present invention will be further described in the following examples, which should be viewed as being illustrative and should not be construed to narrow the scope of the invention or limit the scope to any particular invention embodiments.

Three commercially available polyglycerol esters (PGE), and an industry standard corn oil extraction aid, polysorbate 80 (P80), were tested on samples of evaporated thin stillage (syrup) from three different corn ethanol mills, Mill A, Mill B, and Mill C. Table 1 depicts the average percentage of oil recovery observed for each sample treatment.

TABLE 1

| Avg. % Oil Recovery for each treatment @ 1000 ppm | | | | | |
|---|---|---|---|---|---|
| Treatment | Chemistry | HLB | Mill A | Mill B | Mill C |
| P80 | Polysorbate 80 | 15 | 4.14 | 4.94 | 4.82 |
| Caprol 3GO | Polyglycerol-3-mono-oleate | 6.2 | 5.10 | 5.14 | 6.57 |
| Caprol MPGO | Blend of Polyglycerol-3-mono-oleate + Polyglycerol-10-mono & di-oleate | 8.5 | 6.10 | 5.93 | 6.32 |
| Caprol PGE 860 | Polyglycerol-10-mono & di-oleate | 11 | 6.89 | 6.79 | 6.63 |

Figure 2:
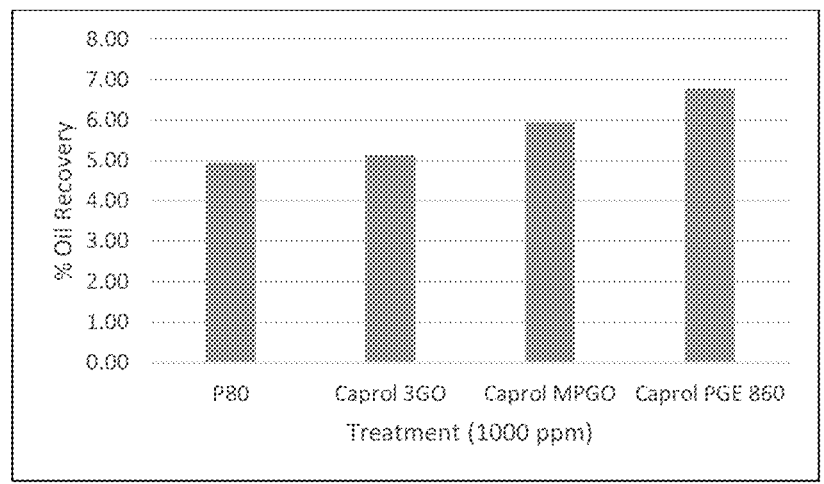
FIG. 2 is a graph providing results of an illustrative embodiment of the disclosed technology.
Figure 3:
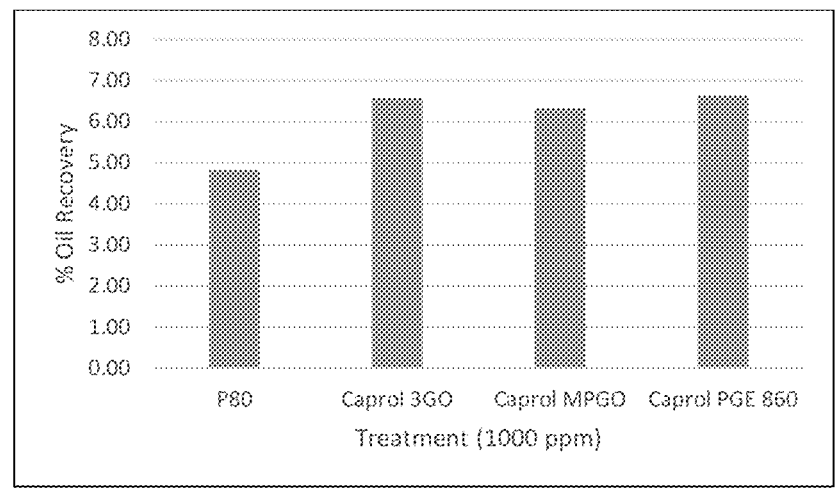
FIG. 3 is a graph providing results of an illustrative embodiment of the disclosed technology.

The oil recovery performance for each sample as compared to polysorbate 80 (P80) is shown in FIGS. 1-3, which depict the oil recovery results from three different corn ethanol mills, Mill A (FIG. 1), Mill B (FIG. 2), and Mill C (FIG. 3). In all cases PGEs performed better than the industry standard treatment (i.e. polysorbate 80) for corn oil extraction during the corn ethanol production process.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. An oil separation treatment composition, the composition comprising a process stream mixture from a corn to ethanol process, and a mixture of polyglycerol esters of fatty acids (PGE).

2. The oil separation treatment composition as recited in claim 1, wherein the process stream mixture is present in a whole stillage process stream, a thin stillage process stream, an evaporator, a syrup stream, or at any time after the distillation stage but prior to the oil separation process.

3. The oil separation treatment composition as recited in claim 1, wherein the PGE is members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

4. The oil separation treatment composition as recited in claim 1, wherein the PGE is non-toxic and digestible.

5. The oil separation treatment composition as recited in claim 1, wherein the mixture of PGE comprises polyglycerol-3-monooleate.

6. The oil separation treatment composition as recited in claim 1, wherein the PGE is a blend of polyglycerol-3-monooleate, polyglycerol-10-monooleate and polyglycerol-10-dioleate.

7. The oil separation treatment composition as recited in claim 1, wherein the PGE is a blend of polyglycerol-10-monooleate and polyglycerol-10-dioleate.

8. The oil separation treatment composition as recited in claim 1, wherein about 50 ppm to about 1000 ppm of the oil separation treatment composition is added to the process stream based upon one million parts of the process stream mixture.

9. The oil separation treatment composition as recited in claim 1, wherein the oil separation treatment composition has an HLB of about 5 to about 15.

10. The oil separation treatment composition as recited in claim 1, wherein the oil separation treatment composition has an HLB of about 6 to about 12.

11. A method for recovering oil in a corn to ethanol process wherein oil and solids are present in a process stream mixture, the method comprising adding to the process stream mixture an oil separation treatment, the oil separation treatment comprises a mixture of polyglycerol esters of fatty acids (PGE), wherein the PGE is members selected from the group consisting of polyglycerol-3-monooleate, polyglycerol-3-dioleate, polyglycerol-3-monostearate, polyglycerol-6-distearate, polyglycerol-10-caprylate/caprate, polyglycerol-10-dipalmitate, polyglycerol-10-monostearate, polyglycerol-10-monooleate, polyglycerol-10-dioleate, polyglycerol-10-tetraoleate or polyglycerol-10-decaoleate.

12. The method as recited in claim 11, wherein the mixture of PGE comprises polyglycerol-3-monooleate.

13. The method as recited in claim 11, wherein the PGE is a blend of polyglycerol-3-monooleate, polyglycerol-10-monooleate and polyglycerol-10-dioleate.

14. The method as recited in claim 11, wherein the PGE is a blend of polyglycerol-10-monooleate and polyglycerol-10-dioleate.

15. The method as recited in claim 11, wherein about 50 ppm to about 1000 ppm of the oil separation treatment composition is added to the process stream based upon one million parts of the process stream mixture.

16. The method as recited in claim 11, wherein the process stream mixture is present in a whole stillage process stream, a thin stillage process stream, an evaporator, a syrup stream, or any time after the distillation stage but prior to the oil separation process.

17. The method as recited in claim 16, wherein the oil separation process further includes centrifuges, decanters, settling-tanks, clarifiers, filters, dissolved or induced air flotation devices, and any other thermal or mechanical device that separates the corn oil from the process stream mixture.

18. The method as recited in claim 11, wherein the PGE is non-toxic and digestible.

* * * * *